Feb. 1, 1927.
A. JACKSON
ATTACHMENT FOR EMERGENCY HAND BRAKE
Filed Nov. 27, 1926
1,616,260
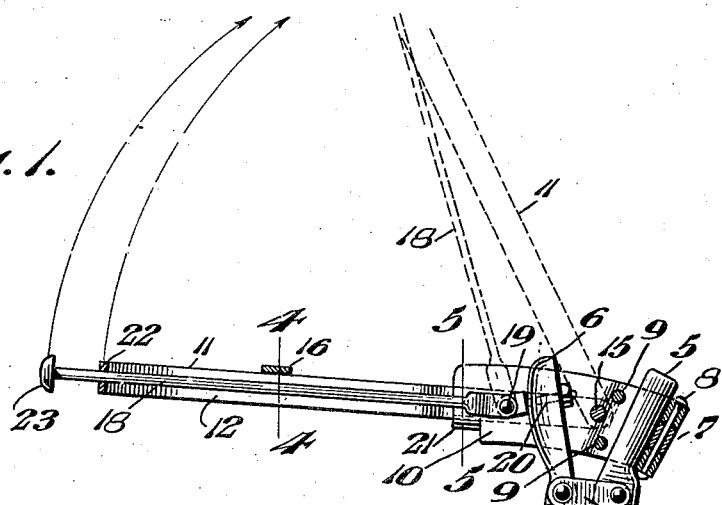
 
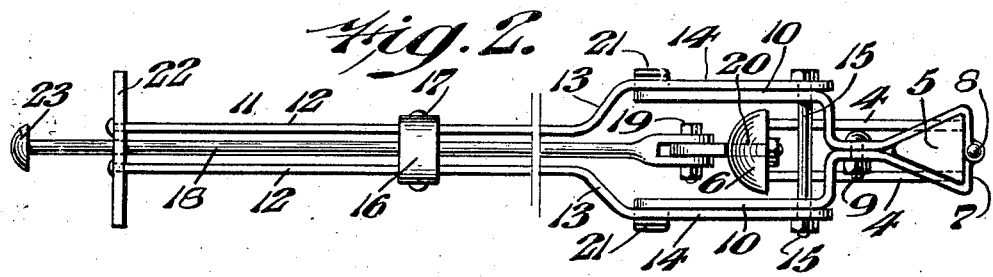
INVENTOR:
ALFRED JACKSON,
BY
ATTORNEYS.

Patented Feb. 1, 1927.

1,616,260

UNITED STATES PATENT OFFICE.

ALFRED JACKSON, OF PHILADELPHIA, PENNSYLVANIA.

ATTACHMENT FOR EMERGENCY HAND BRAKES.

Application filed November 27, 1926. Serial No. 151,043.

My invention relates to a hand brake lever attachment adapted to be installed on self propelled vehicles and the like, whereby the operation or application of such hand brake is greatly facilitated.

My invention further relates to an attachment of the character stated, whereby the emergency hand brake is rendered more readily accessible thus enabling the driver of the vehicle to apply or release the brake without having to stoop from his seat or lose sight of the road or in any way interfering with the driving or control of the car.

In the present construction of automotive vehicles, the emergency hand brake lever is generally located at a point in front of the driver's seat, below the dash board, and while in the forward, inoperative or non-braking position, the same is inclined away from the driver's seat and is in its furthermost forward position with respect thereto, it being necessary to pull the same backwardly towards the driver's seat, when it is desired to apply the brake. In doing this, it is necessary for the driver of the vehicle to stoop and lurch forwardly to reach and grasp the handle of the hand brake lever, thus temporarily losing sight of the road at a moment when unobstructed vision is most desirable. Furthermore, when the driver is in this stooping, strained position, not only is his or her vision momentarily obscured by the dash board, since the head of the driver in this position is liable to be below the lower edge of the transparent windshield, but, in addition the driver of the vehicle, in this position, and until the emergency hand brake has been properly applied, is handicapped from attending to the proper control of the car which is usually necessary in such a moment of emergency.

It is the object of my invention to obviate these disadvantages by providing novel means, whereby the emergency hand brake lever of a vehicle may be applied and released without the driver stooping forwardly or there being any interference with his vision, thus insuring safety and convenience of operation.

Another object of my invention is to provide a hand brake lever attachment which can be deflected upwardly when not in use, if so desired.

To the above ends, my invention consists of an U shaped bracket rigidly secured to the rear handle portion of the emergency brake lever, a housing pivotally secured to said bracket, a push rod having its inner end pivotally secured to, and bearing against the pawl release handle and having its outer end terminating in a handle portion, said rod being adapted to be moved back and forth within said housing, and means for reinforcing said housing to prevent the buckling or collapse thereof while in use.

Other novel features of construction and advantage will appear from the following description taken in conjunction with the accompanying drawings.

For the purpose of illustrating my invention, I have shown, in the accompanying drawings, a form thereof which is at present preferred by me since it will give in practice, satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings:—

Figure 1 represents a view, partly in elevation and partly in section, of a hand brake lever equipped with the novel attachment embodying my invention, the same being shown in full lines in the operative position and in dotted lines in the inoperative position.

Figure 2 represents, on an enlarged scale, a plan view of Figure 1.

Figure 3 represents an end elevation of a portion of the front of Figure 1.

Figure 4 represents a section on line 4—4 of Figure 1.

Figure 5 represents a section on line 5—5 of Figure 1.

Referring to the drawings, in which like reference characters indicate like parts, 1 designates an emergency hand brake lever of any conventional construction, comprising the brake lever 2 and the pawl release rod 3, connected by the links 4 in the usual manner. The brake lever 2 terminates in the upper rearwardly deflected handle portion 5, while the pawl release 3 terminates in the front inclined handle portion 6. To the rear handle 5 is rigidly secured the triangular shaped bracket 7 by means of the bolt 8, the sides of said triangular bracket being secured together at the apex by means of the bolt or other fastening means 9, and extending outwardly and forwardly to form the arms 10 of the U shaped bracket, as will be understood from Fig. 2. 11 designates a housing comprising the arms 12, the inner or front ends of which are bent outwardly as at 13 and terminate in the arms 14, pivoted to the arms 10 of the U shaped bracket, at 15, as will be understood from Figure 2. 16 designates a reinforcing transverse strap secured to said arms 12 by the fastening means 17, to prevent the buckling or bending thereof under pressure. Within the housing 11 slides the push rod 18, the inner forked end of which is pivoted at 19 to the pin or bolt 20 passing through the handle portion 6 as will be understood from Figures 1 and 2. The outer ends of the arms 10 are bent outwardly to form abutments 21 which support and form stops for the arms 14 of the housing 11, when the latter is in its horizontal or operative position, shown in Figures 1 and 5. 22 designates a front transverse handle member suitably secured to the front of the housing 11 and provided with a central hole through which the push rod 18 extends and in which it is guided, the latter terminating in the knob or handle 23, as will be understood from Figures 2 and 3.

The operation of my novel device is as follows:—

When it is desired to apply the emergency brake, the operator grasps the handle 22 and presses against the knob 23 in the palm of the hand. The push rod 18 is then pressed inwardly and forces the handle 6 backwardly towards or against the lever handle 5, thus releasing the pawl rod 3 after which a pull backwardly on the handle 22 to the desired extent, applies the emergency brake in the usual manner.

The push rod 18 is normally kept in its outermost or inoperative position shown in Figures 1 and 2, by the downward pull of the spring of the pawl release 3, which normally keeps the handle 6 in its angular, outwardly inclined position seen in Figure 1, thereby constantly pressing said push rod 18 outwardly into the position seen in Figures 1 and 2. By pivoting the rod 18 to the handle 6, as at 19 and by pivoting the housing 11 to the arms 10 as at 15, my novel attachment can be moved upwardly in the direction of the arrows to the inoperative, out-of-the-way position, indicated by the dotted lines in Figure 1, when for any reason it is desired to do this.

I have thus devised a novel emergency brake lever attachment, which is of a simple and inexpensive construction and which insures convenience and safety of operation, and is further adapted for ready installation, by unskilled labour on emergency brake levers of any conventional character, on cars now in use, or in process of manufacture.

It will be understood that the lower end of the brake lever 2 is connected to the braking mechanism in any conventional manner and that the lower end of the pawl release rod 3 is provided with a spring pressed pawl of the usual construction. I have deemed it unnecessary to show or describe the connections at the lower ends of the members 2 and 3 as the same may be of any conventional type and their construction and mode of operation are well known to those skilled in the art.

It will now be apparent that I have devised a novel and useful attachment for emergency handbrakes which embodies the features of advantage enumerated as desirable in the statement of the invention and the above description, and while I have, in the present instance shown and described a preferred embodiment thereof which will give in practice satisfactory and reliable results, although it is to be understood that such embodiment is susceptible of modification in various particulars without departing from the spirit or scope of the invention or sacrificing any of its advantages.

Having thus described my invention, what I claim as new and desire to secure by Letters Patent is:—

1. In a device of the character stated, a bracket, having rearwardly extending arms provided with abutments, a housing pivotally mounted on said bracket and normally extending laterally and resting on said abutments, a pawl release handle, a push rod slidable in said housing and pivotally connected with said pawl release handle, and a front transverse handle for said housing through which said push rod passes, and in which it is guided.

2. In a device of the character stated, a bracket having rearwardly extending arms provided with abutments, a brake lever, means for attaching said bracket to a brake lever, a housing pivotally mounted on said bracket and normally extending laterally and resting on said abutments, a pawl release handle, a push rod slidable in said housing and pivotally connected with said pawl release handle, and a front transverse handle for said housing through which said push rod passes.

3. In a device of the character stated, a brake lever, a pawl release handle therefor, a bracket secured to the upper portion of said brake lever and having laterally extending arms provided with offset abutments, a housing consisting of arms pivotally secured to the arms of said bracket and normally resting on said abutments, a transverse strap for reinforcing said housing arms, a push rod movable in said housing and having its rear end pivotally connected to said pawl release handle, and a transverse handle for the front of said housing, said latter handle having a hole therein in which the front of said push rod is guided and supported.

ALFRED JACKSON.